United States Patent [19]

Zweekly

[11] Patent Number: 4,465,412

[45] Date of Patent: Aug. 14, 1984

[54] CHIP BREAKING INSERT FOR METAL CUTTING TOOLS

[75] Inventor: Raymond T. Zweekly, Royal Oak, Mich.

[73] Assignee: The Valeron Corporation, Troy, Mich.

[21] Appl. No.: 415,354

[22] Filed: Sep. 7, 1982

[51] Int. Cl.³ .............................................. B26D 1/00
[52] U.S. Cl. .................................... 407/114; 407/116
[58] Field of Search ................................. 407/114–117

[56] References Cited

U.S. PATENT DOCUMENTS

| | | | |
|---|---|---|---|
| 3,395,434 | 8/1968 | Wirfelt | 407/114 |
| 3,800,379 | 4/1974 | Hopkins | 407/114 |
| 4,059,363 | 11/1977 | Romagnolo | 407/114 |
| 4,065,223 | 12/1977 | Nelson | 407/114 |
| 4,335,984 | 6/1982 | Zweekly | 407/114 |

Primary Examiner—Leonidas Vlachos
Assistant Examiner—Jerry Kearns

[57] ABSTRACT

The disclosure relates to an insert for a metal cutting tool having a chip breaking groove in the top face thereof of truncated conical lateral cross section defined by spaced angularly related straight side walls joined by a straight bottom portion extending parallel to the top face of the insert.

10 Claims, 14 Drawing Figures

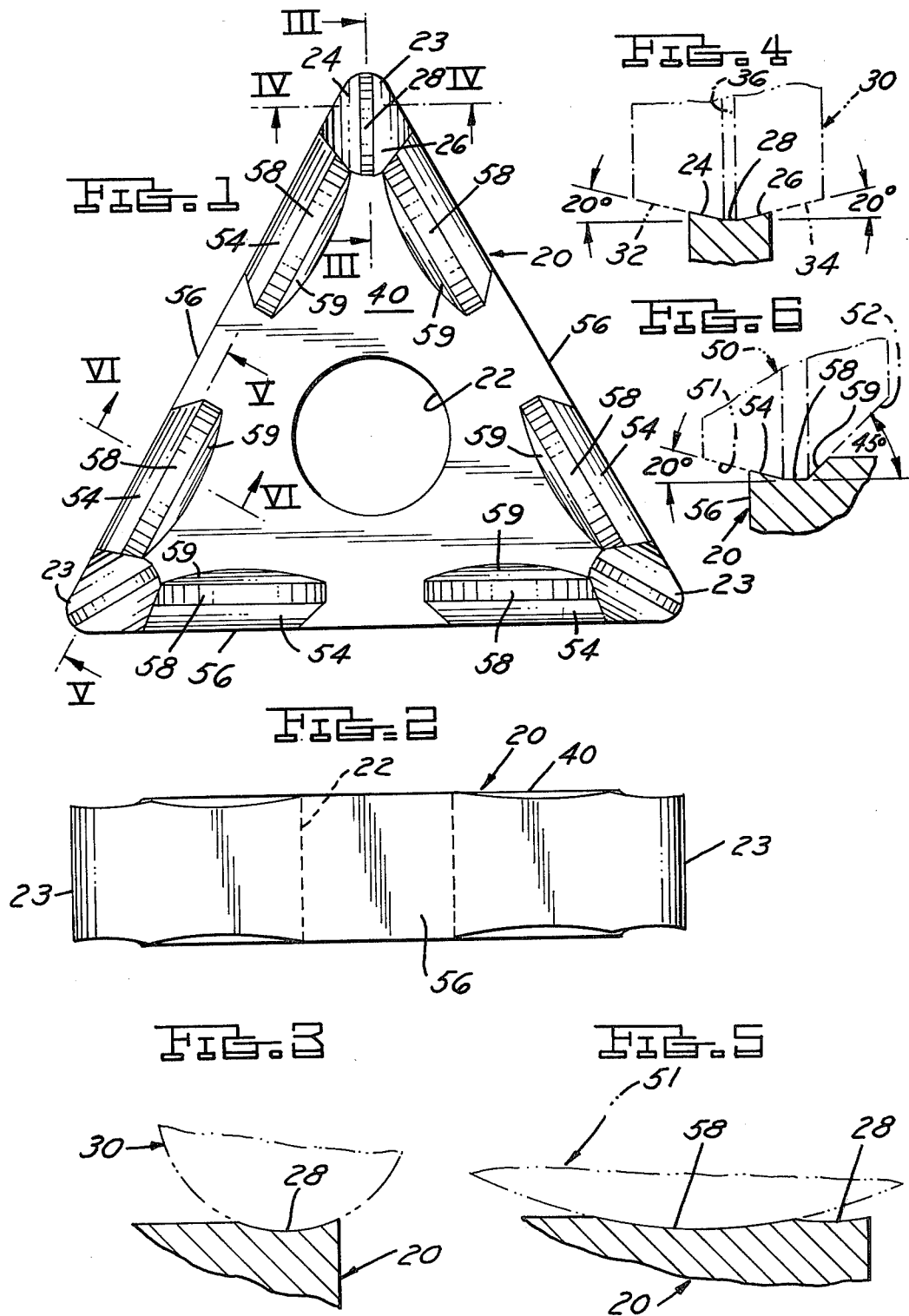

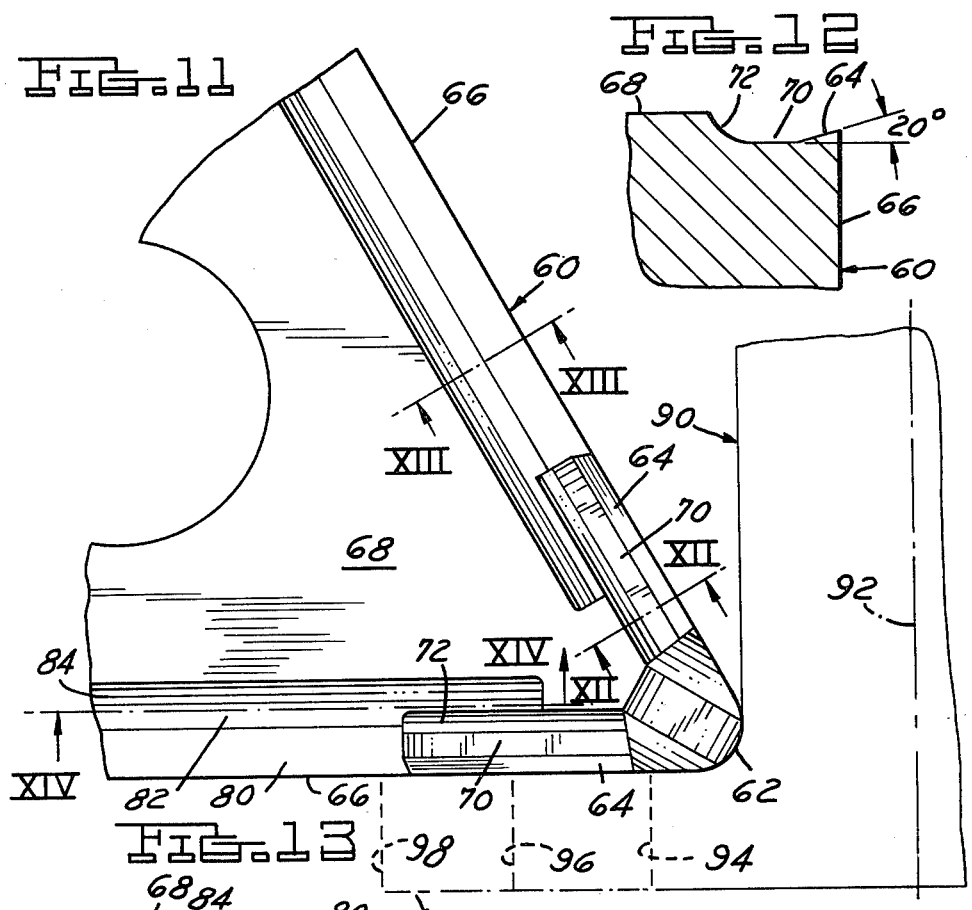

CHIP BREAKING INSERT FOR METAL CUTTING TOOLS

BACKGROUND OF THE INVENTION

Form-sintered metal carbide inserts are often attached to the end of a cutting bar or other machine tool to maximize tool cutting speed and efficiency. Such inserts are generally of polygonal configuration to provide multiple, indexable, cutting edges at the sides and corners of the insert. Generally, the top face of the insert extends at substantially a right angle to the surface of the workpiece and is provided with a "chip breaker" in the form of a groove or other structural configuration. Chip breakers are important to the function of the machine tool as well as to personal safety of the machine operator in that if the turning forms long threads or continuous curls as opposed to being broken into chips, such threads or curls may become wound around the workpiece or become entangled in the machine tool creating substantial risk of personal injury and disturbance of the cutting operation. However, chip breaking under varying working conditions, for example, varying feed and cutting depth, requires careful attention to the combination of feed, cutting depth, and chip breaker configuration.

As a chip breaker breaks the chip only within a certain limited range of cutting depth and feed, as defined by the shape and size of the chip breaker, it is necessary to provide inserts having different chip breaker configurations for different cutting depths and feeds.

A special problem is presented with respect to effective chip breaking in finish cutting because both the cutting depth and the feed are relatively small. A conventional chip breaker chosen with regard to suitable shape and size for rough cutting is unacceptable when the workpiece is to be finished. At small cutting depth it is essential to decrease the rake angle in order to break the chip satisfactorily. Stated another way, it is important to have significant chip breaking capability at the nose of the insert since, at small cutting depths and feeds, the chip has to be sharply bent in order to break because of its small cross section. On the other hand, if the chip breaker is dimensioned for small chip thickness and cutting depth, the angles thereof will be too severe for chip breaking at larger chip thickness and cutting depth.

The deformation or initial bend which the turning receives in the course of separation from the workpiece depends not merely upon its thickness but also upon rake angle. A decreasing rake angle means increasing initial bend but results in increasing cutting forces. Increasing the rake angle permits large cutting depths with relatively smaller cutting forces but decreased initial bend of the turning.

Inserts having a chip breaker at the corner or nose thereof as well as a chip breaker groove alongside the cutting edge of the insert of varying depth and/or width, are well known. Specifically, chip breaking inserts having an initial flat cutting surface which is backed up by an arcuate chip breaking section are taught in the patents to Wirfelt Nos. 3,395,434; Stambler 3,885,281; Gehri 3,968,550 and Newcomer 3,381,349. The chip breaker disclosed in each of the aforesaid patents features an initial flat cutting surface which extends at substantially a right angle to the surface of the workpiece which blends into an arcuate chip breaker. The insert may be orientated at a positive or negative rake, if desired.

Another chip breaking configuration is the "V" configuration as taught in the patents to Krugger Nos. 4,288,179; Seidel 4,056,872; Arnold 4,189,265; and Lundgren 3,866,282.

While the inserts taught in each of the aforesaid patents can be utilized in a specific application, a need exists for an improved insert having an efficient chip breaker for finish cuts as well as cuts of greater depth and feed.

SUMMARY OF THE INVENTION

The insert of the instant invention features a chip breaking configuration on the nose thereof that, in transverse cross section, comprises a center flat disposed between angularly related side walls. The center flat is a segment of a right circular cylinder and the adjacent side walls are segments of opposed truncated cones. The center flat of the chip breaking groove initiates deflection of the turning, bending continuing and breaking occurring when the curl hits the opposite side of the chip breaker configuration. Less severe chip breakers are provided along the sides of the inserts.

BRIEF DESCRIPTION OF THE DRAWINGS

FIG. 1 is a top plan view of an insert in accordance with a constructed embodiment of the instant invention.

FIG. 2 is a side elevational view of the insert of FIG. 1.

FIG. 3 is a cross-sectional view taken substantially along the line III—III of FIG. 1.

FIG. 4 is a cross-sectional view taken substantially along the line IV—IV of FIG. 1.

FIG. 5 is a view taken substantially along the line V—V of FIG. 1.

FIG. 6 is a view taken substantially along the line VI—VI of FIG. 1.

FIG. 11 is a fragmentary view, similar to FIG. 1, of a yet another embodiment of the instant invention.

FIG. 12 is a view taken substantially along the line XII—XII of FIG. 11.

FIG. 13 is a view taken substantially along the line XIII—XIII of FIG. 11.

FIG. 14 is a view taken substantially along the line XIV—XIV of FIG. 11.

DETAILED DESCRIPTION OF THE PREFERRED EMBODIMENTS OF THE INVENTION

Figure 7:
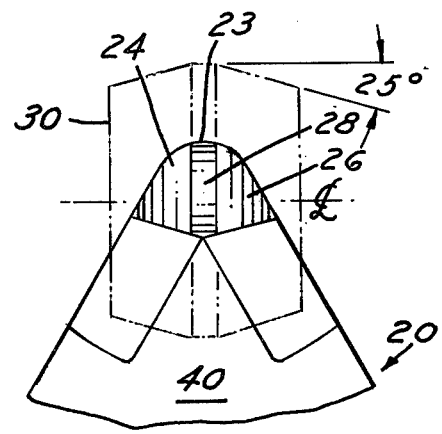
FIG. 7 is a fragmentary view of the nose portion of a modified insert.

As seen in FIG. 1 of the drawings, a cutting insert 20, in accordance with an exemplary constructed embodiment of the instant invention, is of triangular configuration, a central aperture 22 therein providing for attachment to a tool (not shown). As best seen in FIG. 4 of the drawings, the corners or "nose" portions 23 of the triangular configuration of the insert 20, are provided with a truncated, V-shaped chip breaking groove, opposite conical side walls 24 and 26 of which are connected by a cylindrical section 28. The aforesaid configuration is ground into the insert 20 by a grinding wheel 30 having truncated conical surfaces 32 and 34 spaced apart by a cylindrical surface 36. The conical surfaces 32 and 34 extend at an angle of from 12°-25° with respect to the central axis of the grinding wheel 30. In an exemplary constructed embodiment, the diameter of the grinding wheel 30 is 0.140 inches and the angles of the conical sections 32 and 34 are 20° relative to the central axis thereof.

Figure 8:
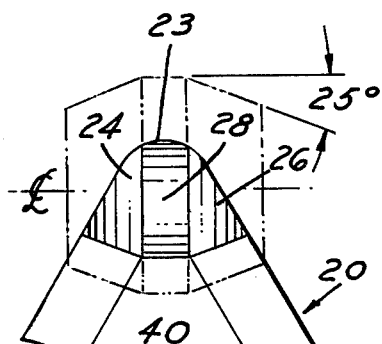
FIG. 8 is a view, similar to FIG. 7, of another modified insert.
Figure 9:
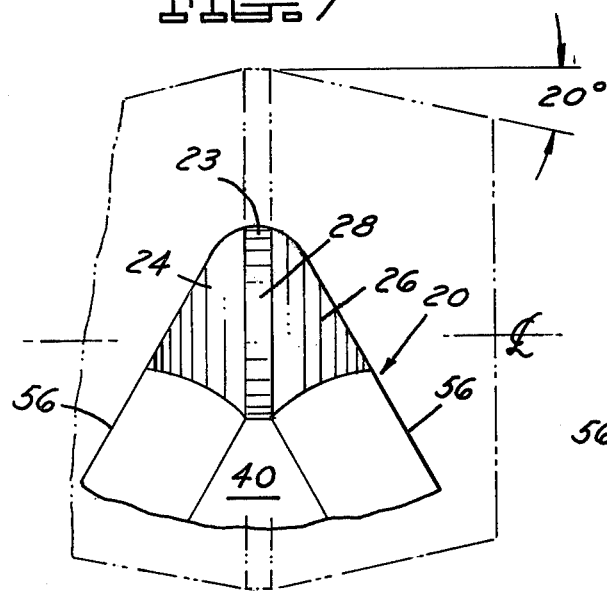
FIG. 9 is a view, similar to FIG. 7, of yet another insert.
Figure 10:
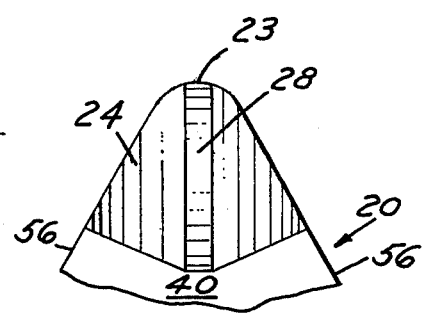
FIG. 10 is a view, similar to FIG. 7 of still another embodiment of the invention.

As best seen by comparing FIGS. 7-10 of the drawings, the V-shaped groove at the nose 23 of the insert 20 is formed by a plunge grind in a direction parallel to the axis of the central aperture 22 of the insert 20. The plunge grind intercepts a top face 40 of the insert 20, the axis of rotation of the grinding wheel 30 being spaced from the tip 23 of the insert 20 to provide a rake angle desired for a specific application. By comparing FIGS. 7, 8 and 9, it should be apparent that the rake angle of the surface 28 of the insert 20 can be controlled by the spacing of the axis of rotation of the grinding wheel 30 from the arcuate tip 23 of the insert 20. For example, movement of the axis of rotation of the grinding wheel 30 toward the tip 23 as illustrated in FIG. 8, will result in a relatively lower rake angle than the angle of the section 28 in the inserts illustrated in FIGS. 7 and 9. Thus, rake angle of the center chip breaker section 28 can be controlled by the placement of the plunger grind on the insert 20.

As best seen in FIGS. 1, 5 and 6, an intermediate chip breaker groove is formed by a grinding wheel 50 and comprises a conical surface 54 that intersects a side face 56 of the insert 20 to form a positive rake aracuate cutting edge therewith. The conical surface 54 extends at an angle of approximate 20° to the top face 40 of the insert 20. A cylindrical intermediate chip breaker section 58 intersects the surface 54 and also intersects a conical chip breaker section 59. The section 59 extends at an angle of 45° to the top face 40 of the insert 20. Thus, a turning flowing across the surface 54 is given an initial change in direction by the surface 58 and is thereafter curled and broken by the surface 59. The chip breaker configuration illustration in FIG. 6 has application to intermediate depths of cut and feed. As with the surfaces 24, 26 and 28 of the nose chip breaker, the surfaces 54 and 59 are sections of a cone whereas the surface 58 is a section of a right circular cylinder. The aforesaid groove configuration is ground into the insert by a grinding wheel 50 having conical surfaces spaced apart by a cylindrical surface, complementary to the surfaces 54, 58 and 59. In an exemplary constructed embodiment the surfaces 54 and 59 extend at angles of 20° and 45°, respectively, with respect to the top face 40 of the insert 20.

As seen in FIG. 11, a modified insert 60 is of triangular configuration and comprises an arcuate tip 62 for finish cuts at rates similar to the insert 20. The insert 60 is to be distinguished from the insert 20 in that side or high speed and depth cutting edges thereof are provided with modified chip breaker grooves spaced from the arcuate tip 62. As best seen in FIG. 12, the chip breaker groove adjacent the nose 62 comprises an angular flat 64 that intersects a side face 66 of the insert 60 to form a cutting edge therewith. The surface 64 extends at an angle of approximately 20° to a top face 68 of the insert 60. A flat intermediate chip breaker section 70 intersects the surface 64 and blends into an arcuate chip breaker section 72. Thus, a turning flowing down the surface 64 is given an initial change in direction by the chip breaker surface 70 and thereafter is curled and broken by the arcuate surface 72. The chip braker configuration illustrated in FIG. 12 has application to intermediate depths and feeds.

As best seen in FIG. 13 of the drawings, a chip breaker configuration at relatively greater spacing from the arcuate tip 62 comprises a surface 80 that intersects the edge face 66 to form a cutting edge. An intermediate secion 82 is parallel to the top face 68 of the insert 60. An arcuate section 84 is provided on the opposite side of the center section 82 from the surface 80. The chip breaker configuration illustrated in FIG. 13 can be distinguished from the chip breaker groove of FIG. 12 in that it is adapted to break chips formed at relatively high rates of feed and depths of cut.

As seen in FIG. 11, a workpiece 90 having an axis of rotation 92 is shown in operative association with the tool insert 60. The arcuate cutting tip 62 of the insert 60 is utilized at relatively shallow depths of cut and light feeds, as shown by the dashed line 94. An intermediate cut indicated by the dashed line 96 is coextensive with the intermediate chip breaker configuration illustrated in FIG. 12. For greater depths of cut as indicated by the broken line 98 in FIG. 11, the chip breaker configuration illustrated in FIG. 13 is utilized. Thus, the insert 60 like the insert 20 accommodates varying depths of cut and rates of feed.

As seen in FIG. 14 of the drawings, the relatively long chip breaker configuration illustrated in FIG. 13 of the drawings, is achieved by a continuous grind along the cutting edge of the insert 60 as opposed to a plunge cut. Similarly, the intermediate chip breaker configuration illustrated in FIG. 12 is achieved by a continuous cut for a predetermined distance along the cutting edge of the insert 60. In contradistinction, the chip breaker configuration at the nose section 62 of the insert 60 constitutes a plunge cut by the grinder 30 illustrated in FIG. 4.

In summary, the insert of the instant invention features a fine cut chip breaker having a center flat between angularly related surfaces. Chip control is achieved over a wide range of cutting depths as opposed to known inserts which, in general, feature single purpose surfaces.

More specifically, the insert of the instant invention has a special tip for shallow or finishing cuts at feed rates in range of 0.002" per revolution. The center flat controls initial turning deflection, deflection continuing when the turning hits the other side of the "V" section. A simple "V" without the center flat, as taught in the prior art, results in a chip that is too long before initial curl and also results in too sudden of a change at the opposite "V" section.

The preferred angle of the side flats is 20° with an acceptable range of 12° to 25°. The nose chip breaker is formed by a straight vertical plunge of a grinding wheel. The depth of the plunge cut should be sufficient to extend the contour of the cut to the insert tip with a tolerance allowable to 0.005 below the top surface of the insert. The diameter of the grinding wheel is preferably between 0.130" and 0.150" diameter. Width of the center flat is preferably 0.030", a range of 0.015" to 0.035" is acceptable in triangular, square, or diamond shaped inserts.

The intermediate chip breaker is applicable to the 0.002" to 0.008" feed rate for all depths of cut. The center chip breaker configuration is used for high cutting speed over 0.008" feed rate, for example, 0.010" to 0.020".

While the preferred embodiment of the invention has been disclosed, it should be appreciated that the invention is susceptible of modification without departing from the scope of the following claims.

I claim:

1. A chip breaking insert for a metal cutting tool, said insert comprising a cutting corner at the juncture of a top face and intersecting edge faces thereof, a chip breaking groove in the top face of said insert extending across said corner and intersecting said edge faces, characterized by said chip breaking groove being of spaced truncated conical surface segments with lateral symmetrical cross section (IV—IV) taken normal to said top face (40) and at right angles to a bisecting line (III-—III) of said cutting corner (23) defined by spaced angularly related straight sides (24) joined by a straight bottom line (28), and said bottom line extending substantially parallel to the top face of said insert and at right angles to the edge face (56) section lines of said insert formed by said cross section.

2. The insert of claim 1 wherein the bottom portion of said chip breaking groove comprises a segment of a right circular cylinder and the side portions of said groove comprise segments of oppositely directed cones, the axis of said cylinder being common with the axis of said cones and lying in a plane parallel to the top face of said insert.

3. A chip breaking insert in accordance with claim 2 wherein said chip breaking groove extends at like angles to intersecting edge faces of said insert.

4. The insert of claim 3 wherein the bottom portion of said chip breaking groove intersects the top face of said insert at the junction of the edge faces thereof to define a cutting nose.

5. The insert of claim 4 wherein said cutting nose is arcuate.

6. A chip breaking insert in accordance with claim 1 further characterized by a second chip breaking groove in the top face of said insert extending parallel to the edge face thereof and intersecting said first chip breaking groove.

7. A chip breaking insert in accordance with claim 6 wherein said second groove is of spaced truncated conical surface segments with lateral cross section defined by spaced angularly related straight sides joined by a straight bottom line, said bottom line extending at a right angle to the edge face section line of said insert.

8. The insert of claim 6 including a third chip breaking groove contiguous with said second groove, said third groove having a flat bottom extending parallel to the top face of said insert.

9. A chip breaking insert in accordance with claim 1 wherein the spaced angularly related section sides of said groove extend at oppositely directed like angles with respect to the top face of said insert within the range of 12° to 25°.

10. The insert of claim 1 wherein the bottom portion of said chip breaking groove comprises a segment of a right circular cylinder that intersects the top face of said insert to define a cutting nose having positive rake relative to said top face.

* * * * *